CUTANEOUS SIGNALING

Filed April 28, 1949 4 Sheets-Sheet 1

INVENTOR
A. B. ANDERSON
BY
ATTORNEY

March 1, 1955 | A. B. ANDERSON | 2,703,344
CUTANEOUS SIGNALING
Filed April 28, 1949 | 4 Sheets-Sheet 2
FIG.5
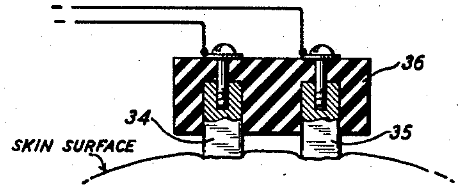
FIG.6
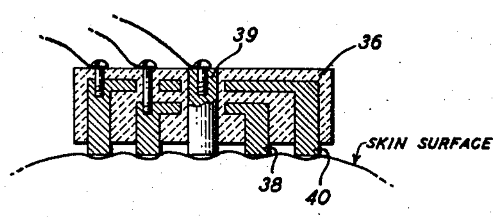
FIG.7
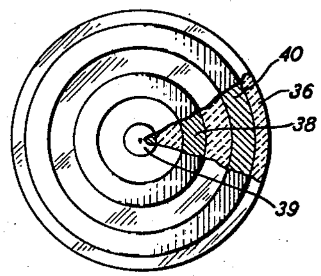
FIG.8
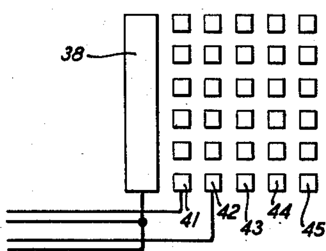
FIG.9
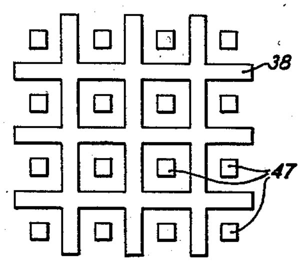
FIG.10
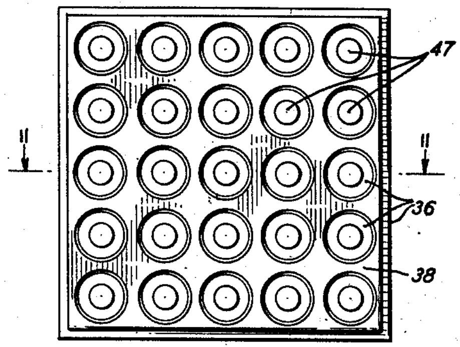
FIG.11
36
47
38
INVENTOR
A. B. ANDERSON
BY
[signature]
ATTORNEY CUTANEOUS SIGNALING
Filed April 28, 1949 4 Sheets-Sheet 3
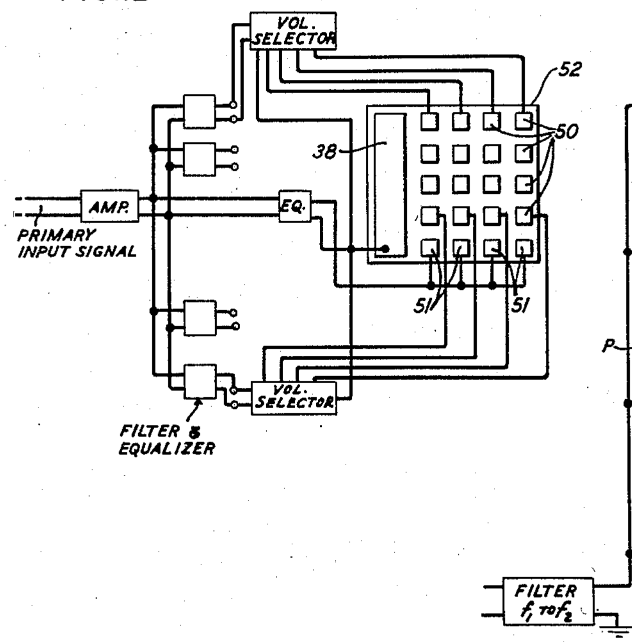
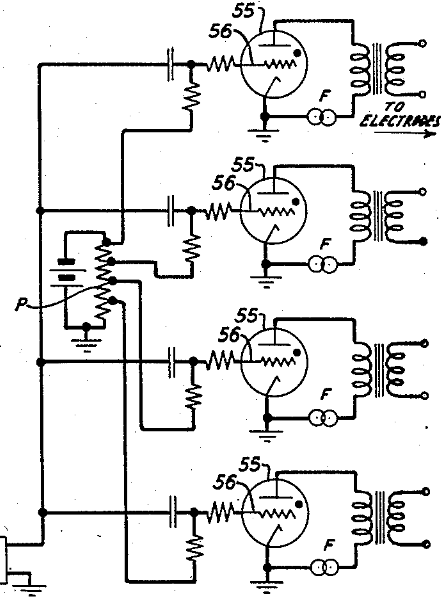
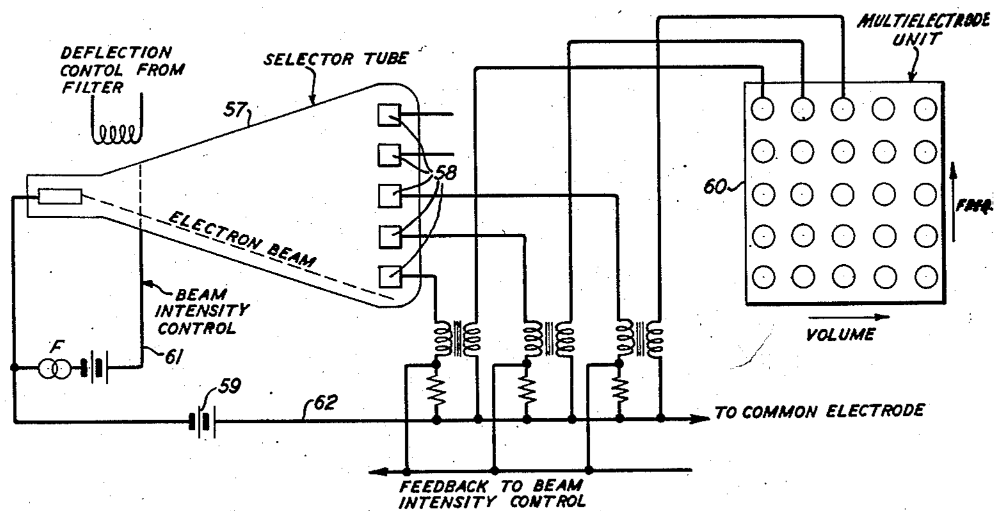
INVENTOR
A.B. ANDERSON
BY
ATTORNEY CUTANEOUS SIGNALING
Filed April 28, 1949 4 Sheets-Sheet 4
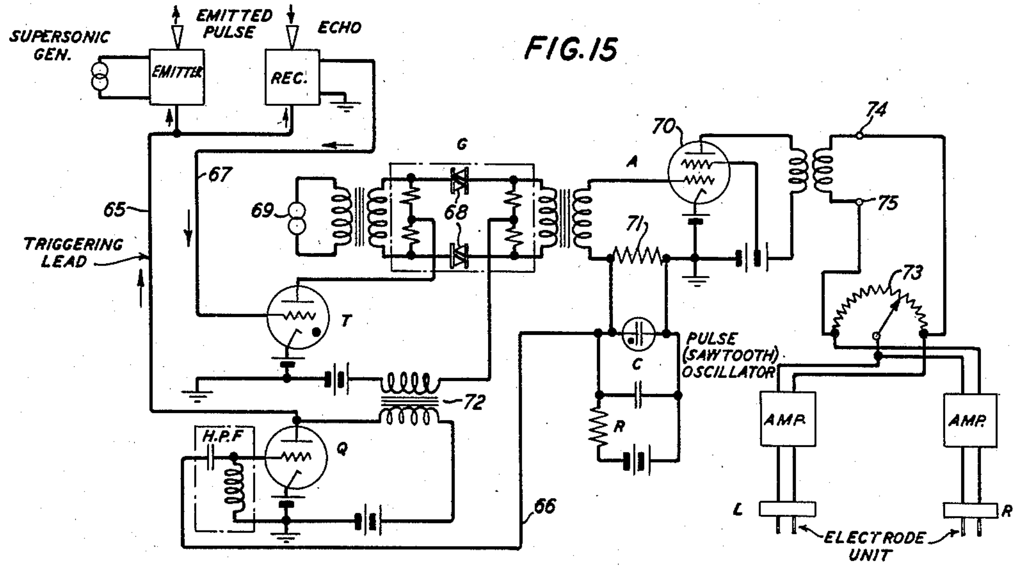
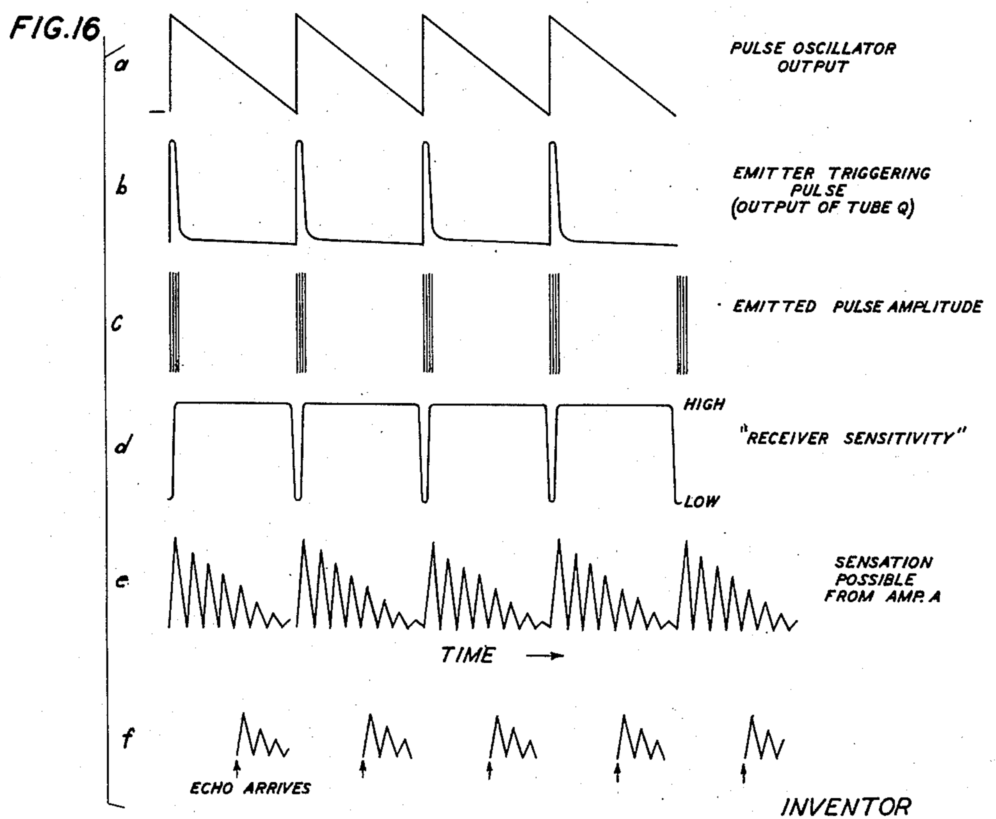
INVENTOR
A.B. ANDERSON
BY
ATTORNEY United States Patent Office 2,703,344

Patented Mar. 1, 1955

2,703,344

CUTANEOUS SIGNALING

Attell B. Anderson, Morristown, N. J., assignor to Bell Telephone Laboratories, Incorporated, New York, N. Y., a corporation of New York Application April 28, 1949, Serial No. 90,262

9 Claims. (Cl. 179—107)

This invention relates to methods of and systems for conveying intelligence by electrical stimulation of the skin.

One object of this invention is to convert information ordinarily received by visual or aural means into electrical impulses which are conveyed to the skin and interpreted by the characteristics of the resulting stimulation.

The invention is particularly adapted for use where the reception of auditory, visual, or similar signals may not be possible or permissible, as in the case where an individual may be deaf and does not wish to be or cannot be helped by the more conspicuous audiphone receivers utilizing air or bone conduction. Other applications include its use by a blind person as an obstruction detecting device where an acoustic signal to his ears may be impossible because of his deafness, dangerous because it would mask out the sound which objects and persons in his vicinity may make and which in themselves would help him avoid danger, or offensive to passers by.

In accordance with a feature of this invention, intelligence is conveyed to an observer in the form of electrical impulses having characteristics which are separated into significant portions and applied to the skin of the observer. The characteristics are of various forms and combinations of forms, for example, length, amplitude, or frequency of the stimulation. When the system is employed to convey signals which have an acoustic origin they can be represented to the observer by converting the sound waves to electrical waves having corresponding frequency components, separating these components into a plurality of bands, and applying the components in each band to an individual electrode in contact with the observer's skin. The location of the various electrical stimuli on the skin then indicates the frequency components present in the sound, and the stimulation intensity at each location indicates the degree that that frequency contributes to the sound. Alternatively, the electrical signal characteristics produced by the sound can be broken down as to frequency components and these components further subdivided into energy levels so that the localized electrical stimulation resulting from these subdivided signals indicate both the frequency and strength of the component in the sound.

A ranging system wherein a wave of short duration is emitted and a reflected wave is used to trigger a stimulating pulse, exemplifies another embodiment of this type of system for communicating intelligence in which the duration of stimulation has significance. The length of the stimulating pulse is a function of the range of the reflecting body by virtue of having the generator of the pulse enabled for a fixed interval after the ranging wave is emitted but capable of initiating a stimulating pulse only upon receiving a reflected wave. Thus, for a reflecting surface at close range, a short echo time exists, and the stimulating pulse is practically the full length of the period for which the generator is enabled. On the other hand, for a more distant reflecting surface the echo time is longer and the length of the stimulation pulse is a relatively small portion of the enabled period of the generator. In this embodiment of the system, a long stimulation indicates a close object and a short stimulation a distant one.

It has been found that direct electrical stimulation of the tactile nerves is accomplished most satisfactorily by employing alternating-current stimuli rather than direct current. Direct currents even when applied for relatively short periods burn the skin sufficiently to cause open blisters to form under the negative electrode. On the other hand, alternating impulses when applied with properly proportioned and spaced electrodes even at relatively high potentials, on the order of twenty times blistering direct-current potentials, over extended periods of application have exhibited no injury to the skin.

Alternating-current stimulations are similar to tactile stimulations particularly at lower intensity levels. Tests have shown that the skin feels as though it were being stroked with a comb having varying degrees of coarseness, the coarseness decreasing with the increase in frequency until at the higher frequencies it becomes of a feathery quality. At higher stimulation levels, the sensation becomes more nearly that of a pressure and finally becomes painful as the level is carried to an extreme, on the order of from 10 to 15 decibels up from one milliampere in the range from 100 to 10,000 cycles per second. Thus over rather wide ranges of intensity and frequency, alternating-current impulses are readily discernible without being excessively unpleasant.

Direct electrical stimulation when compared with the other forms of stimulation of the senses exhibits characteristics indicating that various signaling systems can be developed by utilizing this method. For example, while the frequency limit of tactual sensations to a vibrating element in contact with the skin is in most cases below 3,000 cycles, it is easy to detect electrical stimulation of frequences beyond 10,000 cycles. The intensity resolution of the electrical stimulation signals up to at least 5,000 cycles is at least twice that of the acoustical signals up to the same frequency. However, it appears that the frequency discrimination by electrical impulse stimulation is relatively poor compared to the discrimination observed acoustically; positive discrimination being possible between 1,000 cycles and 5,000 cycles, for example, but not between 1,000 cycles and 4,000 cycles.

From the above it can be seen that significant information can be conveyed by the intensity of the electrical stimulation over a wide range of the frequency spectrum. Since frequency resolution of this stimulation is relatively poor, some alternative for this type of resolution may be employed. This can be done by the use of a plurality of electrodes each fed by a narrow frequency band making up only a portion of the input frequency spectrum. By proper spacing of these electrodes the discriminatory power as far as frequency is concerned can be considerably improved over that for a single set of electrodes and thereby increased intelligibility can be conveyed.

Several embodiments of a system of communication utilizing stimulation by electrical impulses to convey received information to the observer are set forth in the following description which can be more readily understood when read in conjunction with the accompanying drawings in which:

Fig. 1 discloses a basic circuit for a cutaneous signaling system in block diagram form;

Fig. 5 is a partially sectioned elevation view of a typical set of electrodes;

Fig. 6 is a partially sectioned elevation view of a structure including a plurality of sets of electrodes;

Fig. 7 is a partially sectioned plan view of the electrode structure of Fig. 6;

Figs. 8, 9 and 10 are plan views of several multiple electrode set arrangements;

Fig. 11 is a partially sectioned elevation of the electrode structure of Fig. 10 taken along the line 11—11;

Fig. 12 is a block diagram of a signaling system utilizing a multiple electrode structure;

Fig. 13 illustrates one form of volume selector circuit which might be utilized in the circuit represented in Fig. 12;

Fig. 14 is another form of volume selector circuit which may be employed in the circuit of Fig. 12 utilizing an electronic switch to place signals upon the various electrodes;

Fig. 15 illustrates a circuit for a ranging and detecting system which conveys its information to the user by cutaneous stimulation; and Fig. 16 discloses the significant wave forms which are produced in the circuit of Fig. 15.

Figure 1:
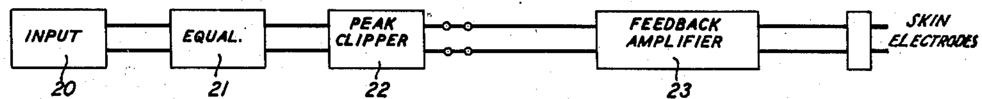

While in its basic form a cutaneous signalling system can consist of an input device and an amplifier which supplies its output current to a set of electrodes in intimate contact with the skin, better resolution of the characteristics of the various stimulating potentials can be obtained by the use of equalizers and peak clipper circuits in conjunction with the basic input, amplifier and electrode structure as shown in Fig. 1. Further improvement of frequency resolution can be obtained by splitting the frequency spectrum of the input into a plurality of complementary frequency bands and allowing each band to excite its own separate set of electrodes as represented by the filters LPF and HPF, the amplifiers and the electrodes of Fig. 2, these elements being inserted behind the peak clipper of Fig. 1 in place of the feedback amplifier and skin electrodes shown there.

For example, where the system is employed to transmit acoustic waves to a deaf individual, the input device may be a microphone to pick up the waves such as those of speech. In such a system, the use of a frequency equalizer to maintain a constant level of stimulation over the frequency band and a peak clipper to avoid uncomfortably high intensity impulses has been found of great help in improving the ability of the listener to resolve the various features of the incoming wave pattern. Further increase of frequency resolution is attained by the use of multiple sets of spaced skin electrodes fed through low-pass and high-pass filters whereby the spacial relationship of the stimuli indicates the frequencies which make up the sound picked up by the microphone. A device for the transmission of such audio waves is disclosed in a practical form in Fig. 3. It comprises a microphone 20, filter or equalizer 21, peak clipper 22 and amplifier 23 coupled as shown.

The amplitudes present in speech as a function of frequency are at a maximum at frequencies around 400 cycles and the amplitudes at higher frequencies fall off at the rate of about 6 decibels per octave. Because of the restricted volume range which the skin is able to handle, it is desirable to equalize this speech characteristic so that the skin will receive an approximation of constant amplitude stimulation by the frequencies transmitted by the system. Such an equalization is accomplished to a first degree of approximation by use of a filter section or equalizer which gives the over-all system of Fig. 3 a response characteristic as shown in Fig. 4, attenuating the signals to a rather high degree below 1,000 cycles and to a lesser degree above 1,000 cycles.

Further reduction of high peak amplitudes in normal speech and sounds are attained by the use of a peak clipper which is connected to the output of the equalizer by a transformer coupling. Since the high peaks of energy are of little importance in identifying normal speech sounds, they can be eliminated with little material detriment to the transmission of speech intelligibility but with considerable gain in comfort by removing the painful impulses to which the observer might otherwise be subjected under electrical stimulation listening conditions.

This peak clipper circuit comprises an amplifying tube 31 which is R—C coupled to a pair of diode rectifiers 32, biased so as to be non-conductive below certain set levels but becoming conductive for amplitudes above these levels thereby introducing large losses in the series resistance 33 of the circuit and a consequential clipping of peak amplitudes.

Figure 3:
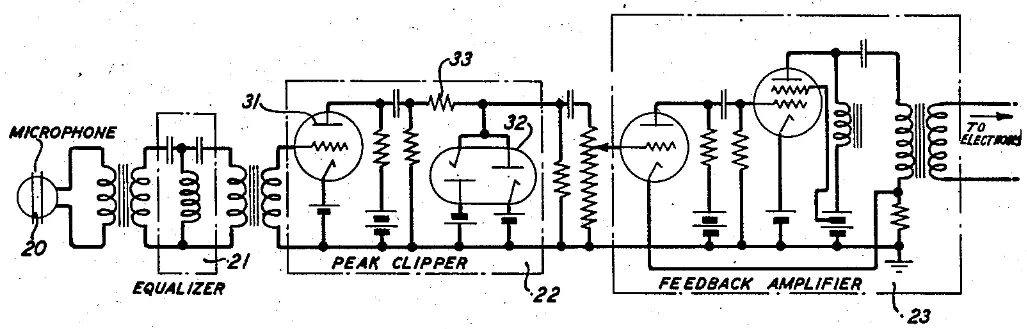
Fig. 3 shows one practical circuit form which the system of Fig. 1 may take.
Figure 4:
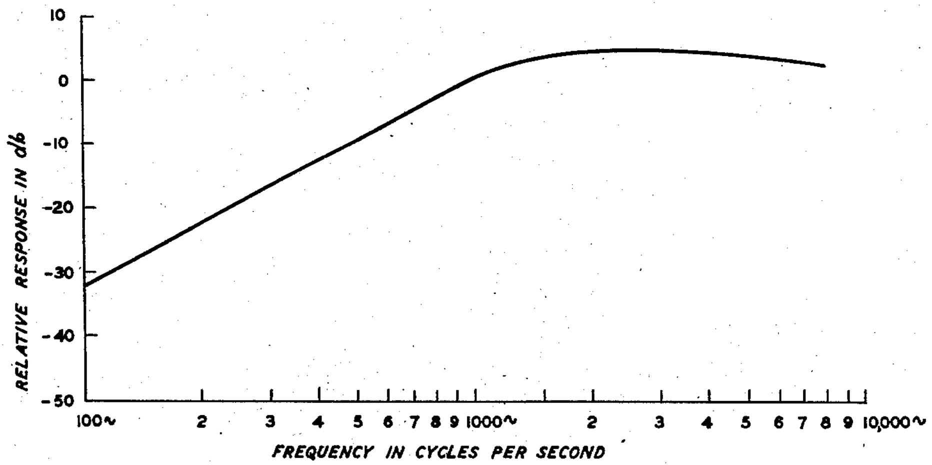
Fig. 4 is a response characteristic for direct electrical stimulation, illustrating the over-all response of the circuit of Fig. 3 over a frequency band from 100 to 10,000 cycles per second.

The output of the peak clipping circuit is R—C coupled to a feedback amplifier which amplifies its output and applies it to the skin of the user through a set of electrodes, not shown in Fig. 3.

The magnitude of the sensation experienced is a function of the current through the skin. Since the impedance of the skin is a variable quantity depending upon variables such as atmospheric conditions and the skin secretions, it is desirable to feed the skin electrodes from a high impedance or constant current device. Such a constant current device is approximated by the use of series feedback from the output load of the amplifier as shown in Fig. 3.

In the above system, the skin electrode structure can be of the form disclosed in Fig. 5 where two electrodes 34 and 35 are fastened in a block of insulating material 36 and the whole unit is made to fasten to the body in some convenient manner, for example to the inner side of the forearm, by means of a strap (not shown), similar to that supporting a wrist watch, so the electrodes are in intimate contact with the skin in that area. As the sensation imparted to the skin by an electrical impulse is a function of the concentration of current through the skin, large area electrodes 34 and 35, having faces which are on the order of a 3/16-inch square and which are separated greater than 1/8 of an inch produce no burning sensation with currents of the order of 10 decibels up from one milliampere. However, it has been found that electrodes materially smaller than those suggested above, produce some discomfort even at greater separations and the larger electrodes, when the separation is reduced, cause a burning sensation to become quite apparent along their edges at higher signal levels.

Figure 2:
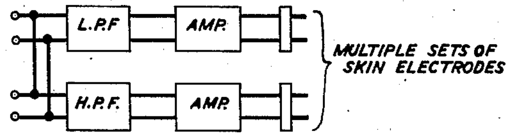
Fig. 2 is a block diagram indicating a refinement or modification of the basic system for improving frequency discrimination.

As has been indicated with reference to the schematic circuit of Fig. 2 by the use of multiple electrodes and selective circuits, the various characteristics of speech or their complex wave stimuli can be caused to stimulate different portions of the skin area and thereby give a spacial distribution of characteristics which will improve the over-all resolving power of the system.

Multiple electrode structures for systems utilizing spacial resolution are disclosed in Figs. 6 through 11. Generally these comprise one electrode 38 of relatively large surface area which acts as one pole of all applied stimulating potentials while the other poles are to be found in various arrangements of electrodes in the structure. Another embodiment of a spacial resolution system would comprise a separation of two sets of electrodes as shown in Fig. 5, for example, one placed on the right arm and the other on the left arm, or both in tandem on one arm.

The concentric electrode structures of Figs. 6 and 7 illustrate one system including a plurality of sets of electrodes. In such a structure the disparity in skin contact areas of the various electrodes 39 and 40 of a given unit would, if all sets were driven by an equal amount of power, produce a higher current density between the inner and intermediate electrodes 39 and 38 than between the outer and intermediate electrodes 40 and 38 where the intermediate electrode 38 was the common electrode to the system. This may result in one set of electrodes 39 and 38 producing an uncomfortable sensation before the other combination 40 and 38 has been permitted to contribute its optimum useful stimulation. Therefore in order to get balanced stimulation it may be necessary to drive the outer set of electrodes 40 and 38 having the greater area at higher energy levels than the set 39 and 38 which have a lesser area.

A grid arrangement of electrodes cooperating with one large common electrode 38 is shown in Fig. 8. This electrode system utilizes two coordinates, the vertical coordinate, for example, indicating frequency and in the embodiment disclosed being fed by five band-pass filters each of which will actuate one set of electrodes when the signal contains frequency components lying within its band, and the horizontal coordinate indicating amplitude or volume of the signal at that frequency. Thus, when the signal contains a frequency component in the lowest band and of high volume, all the electrodes 41, 42, 43, 44 and 45 sensitive to that frequency will be activated while a low volume signal of that frequency would only activate one electrode 41.

The structure of Fig. 9 comprises a common electrode 38 in the form of a lattice having the individual electrodes 47 positioned in the interstices of the lattice, thereby isolating the individual electrode circuits from each other and eliminating cross-talk through the skin between the electrodes. This is also achieved by the structure of Fig. 10, both arrangements utilizing the rectangular coordinate system of Fig. 8 to obtain both frequency and volume resolution of the incoming signals.

A circuit utilizing the rectangular coordinate system for frequency and volume discrimination is illustrated in Fig. 12. This circuit comprises an input device, for example a microphone or other transducer of audible signals, which feeds, in the embodiment disclosed, a group of four parallel combined filter equalizers, each filter transmitting only a portion of the frequency spectrum of the input signal. When applied to a speech transmitting system, the output from a microphone or other transducer device would yield the primary signal. This would then be amplified as required and fed to the filter-equalizer network shown. In the case where four individual frequencies are employed, the filter-equalizer circuits break up the frequency spectrum of the primary signal into several frequency bands, for example 250 to 900 cycles, 900 to 1,900 cycles, 1,900 to 3,300 cycles and 3,300 to 7,000 cycles, each of which controls the actuation of the circuits associated with the electrodes 50 in the corresponding frequency coordinate.

The output of each filter is then passed to a volume selector circuit which determines the number of electrodes 50 to be energized along the horizontal coordinate of the frequency being passed by the filter equalizer. The number of electrodes 50 energized indicates the intensity of the primary input signal in that frequency range. The electrode structure disclosed in Fig. 12 includes a series of five vertical sets consisting of four horizontal electrodes in each set while only four frequency bands are transmitted. The lowermost set of electrodes 51 is utilized for stimulation intensity comparison and spacial reference, it being kept under constant stimulation by a tone or excited by the whole speech of the primary signal whenever the observer is "listening." These reference electrodes 51 are provided and made apparent to the "listener" in order that he may obtain the orientation of the stimulating electrodes with respect to the over-all grid electrodes structure 52. While a set of orientation electrodes is disclosed in Fig. 12 it is to be understood that other electrode arrangements may be employed to orient the signal actuated electrodes, for example a single electrode in one corner of the coordinate system might be used.

One form of volume selector circuit is disclosed in Fig. 13. This circuit employs a local oscillator F to provide a frequency which has satisfactory electrical stimulation characteristics and also is of a high enough frequency to be modulated by the highest frequency which it is desired to observe in the primary signal, viz., a high enough frequency so that all significant details of the signal will be transmitted to the electrodes. This oscillator supplies the alternating-current potential applied to the plate-cathode circuit of a number of gas trigger tubes 55 each of which has its grid 56 held at a successively higher grid bias than the next preceding tube by voltage divider P. Thus as the signal arrives from the filter output it encounters a number of grid circuits at successively higher grid bias conditions and, depending upon the magnitude of the signal, all of those tubes which attain a sufficiently low net grid bias will fire. In turn the tubes which have been fired apply electrical impulses to their associated electrodes in the multiple electrode unit to indicate the instantaneous levels of that portion of the signal lying within the associated frequency band.

The foregoing system reacts only to one-half of the signal wave form much as does a half wave rectifier. For more exacting work it may be desirable to respond to the amplitudes of both halves of the wave form. One simple way of doing this is to rectify the output of the filter with a full wave rectifier and then apply this signal to the array of gas tubes shown in Fig. 13.

Another means of distributing the information of volume level in a particular frequency band is illustrated in Fig. 14. A multiple anode vacuum tube 57 with at least one electron beam is used as an electronic switch and is the means for putting the stimulating signal upon the proper electrode or electrodes as the case may be. In this embodiment the output of the associated band-pass filter is applied to a deflection coil to deflect a beam of electrons an amount which is dictated by the magnitude of the signal received from the filter. A number of collector anodes 58 arranged across the range of the sweep of this electron beam and energized by the potential source 59 serve to complete the circuit to the multiple electrode structure 60, each collector 58 having in its circuit one winding of an inductive coupling, the other side of the coupling being connected to electrodes in the multielectrode unit 60. Alternating-current stimulation by the electrodes is attained by introducing a frequency suitable for direct observation by the "listener" either in the beam intensity control circuit 61, as shown in the drawing, or in the collector anode circuit 62 in series with the potential source 59.

As disclosed, the alternating-current signal from the filter is applied directly to the deflection coils of the electronic switch thereby causing the beam to sweep across a number of the collector electrodes 58. This sweeping causes conduction in all collector circuits whose collectors are within the sweep of the beam and therefore all of the electrodes associated with those collectors are actuated. An alternative wherein only the electrode representing the maximum volume in that frequency band will be actuated can be attained by rectifying the output of the filter and allowing the resultant direct current to deflect the electron beam in the switch. Thus the position of the energized electrode along the volume coordinate will be proportional to the signal level from the filter.

Another form in which the signalling system of this invention may be constructed is that of a bicutaneous ranging and detecting device operating on a principle of perception closely allied to that of binaural systems. This system includes a signal emitter which generates a beam of supersonic waves of the order of 40,000 cycles per second which is caused to scan the region surrounding an individual, the waves being reflected from nearby objects and then presented to him through a multiple set of electrical transducers. For example, if two transducers are used, then one unit can be placed forward of the user's left shoulder and the other unit forward of his right shoulder and the signals received and converted to electrical stimuli for bicutaneous reception and interpretation.

The relative intensities of the stimuli from each electrode transducer is adjusted automatically by potentiometer 73 in Fig. 15 so as to be a function of the position of the obstruction to the left or right of the observer thereby indicating the direction of the obstruction. The absolute intensity of the stimulus is employed as an indication of the range of the obstruction, the nearer the obstruction the higher the stimulus level.

By incorporating an adjustment by which the effective range of the system may be changed as needed, the device may be made to yield an adequate impression of the surroundings with a minimum amount of confusion to the observer under various listening conditions. For use indoors, for example, this device must permit the observer to discriminate between a large number of objects which are all quite near to him and in almost every azimuth position with respect to him. Under such conditions it would therefore be desirable to reduce the range of the instrument so as to disregard the response from objects more than about six feet from the observer. At this range a pulsing rate of the order of 95 pulses per second will provide satisfactory results. On the other hand, for outdoor use it will be desirable to obtain a response from objects over much greater distances. For example, at a range of 100 feet a pulsing rate of the order of 6 pulses per second is desirable.

One form of such a system as discussed above is disclosed in Fig. 15 wherein a series of supersonic pulses are emitted in a scanning beam from a supersonic generator by the application of a triggering pulse of the form shown in Fig. 16*b* over the lead 65 to disable the pulse receiver as indicated in Fig. 16*d* and simultaneously trigger off a pulse, Fig. 16*c*, of the output of the supersonic generator coupled to the emitter. The triggering pulse is the output of the tube Q resulting from the application through the lead 66 of a wave form signal, Fig. 16*a*, from a saw-tooth oscillator through a high-pass filter HPF to the grid of the tube.

After a pulse of supersonic energy is emitted it will travel on until it strikes a reflecting surface at which time part of its energy will be returned to the receiver as an echo. Upon being picked up by the receiver it will trigger gas tube T through the lead 67. The output of this gas tube then acts upon the gate circuit G which consists of a balanced arrangement of rectifiers 68, causing the rectifiers to decrease in resistance and hence reducing the over-all loss from the transformer-coupled oscillator 69 to the transformer-coupled amplifier A. Thus on triggering of the tube T the gate circuit passes a maximum level of signals of the local oscillator to the input of the amplifier tube 70. The local oscillator supplies a frequency which is suitable for "listening" by electrical stimulation of the skin.

The amount of signal which amplifier A can pass to the skin electrode is determined by the particular bias which is on the tube 70 at any instant due to the application of the output of the pulse oscillator on the resistor 71. The stimulation possible from amplifier A when gate G is opened thus becomes a function of time as shown in Figs. 16*e* and 16*f*.

Since gate circuit G is triggered open only by an incoming pulse echo, the output from A at terminals 74 and 75 would look like Fig. 16*e* for a very close obstruction where the echo returns as soon as the transmitter emits the pulse. For a more distant object in which the echo arrives an appreciable time after the emission of the pulse the wave pattern will be more nearly like that of Fig. 16*f*. Thus the longer the interval between the emission of the pulse and the reception of a reflection, the lower the level of stimulation since the maximum amplitude of the pulse will be less and the pulse length will be shorter. Thus more distant objects will produce less stimulation than objects which are closer at hand.

Since there is no grid control of the gas tube T after it has once been fired by the echo pulse, the tube would continue to conduct indefinitely and the gate G would continue to pass the output of the local oscillator to the amplifier A to produce a wave form as in Fig. 16*e*. Therefore, in order to restore control of the circuit to the incoming echo pulses some means of regularly extinguishing T is required. This is achieved by removing the plate voltage momentarily from the tube T simultaneously with the initiating of the next pulse from the emitter by coupling the output, Fig. 16*b*, of the tube Q in opposition to the plate voltage of the tube T by means of the transformer 72. This closes gate G which can then only be reopened by the arrival of a subsequent echo.

In the embodiment of Fig. 15 where a single signal emitter and receiver are employed, the output of the amplifier A from terminals 74 and 75 is applied to a potentiometer 73 to properly proportion the intensity of the stimulation applied to the right and left electrodes R and L as a result of the received reflection, and thereby provide azimuth localization of the reflecting surface. This is achieved by placing the potentiometer across the output terminals 74 and 75 and connecting one of these terminals to each amplifier associated with the individual electrodes. The brush of the potentiometer is connected to the second terminal of each amplifier and so coupled to the beam radiator and echo pick-up that its position on the potentiometer card corresponds to the azimuth position of the scanning beam and its echo. Thus, for example, when the wave radiator and receiver are conditioned to sweep the beam through the quadrant to the observer's left the brush will be located on the potentiometer card so that any electrical impulse resulting from an echo received from a wave reflecting surface on the observer's left will pass from the amplifier A through a short length of the potentiometer and thus a low resistance to the left electrode amplifier, and through a long length of potentiometer and a corresponding high resistance to the right-hand electrode amplifier. Therefore the resulting stimulation on the left electrode will be proportionally greater than that on the right electrode depending on the azimuth localization of the reflecting surface.

To recapitulate, this invention provides a system for communicating intelligence which involves transposing the received signals into corresponding electrical impulses, separating the electrical signals into a plurality of significant portions and causing electrical stimuli to be applied directly to the nerves associated with spaced areas of the skin corresponding to said signal portions thereby indicating the distinguishing characteristics including intensity, frequency and length of the signals.

What is claimed is:

1. A system for conveying intelligence in the form of signals, comprising means for producing the signals in electrical form, a plurality of spaced electrodes adapted to be placed in intimate contact with the skin of an observer, means for dividing the electrical signals into portions of significant intensities, and means for applying the signals in each portion to a respective pair of said electrodes.

2. A system for conveying intelligence in the form of signals comprising means for producing the signals in the form of electrical waves having varying amplitudes, a plurality of spaced electrodes adapted to be placed in intimate contact with the skin of an observer, input circuits for said electrodes arranged to respond to successively higher input levels, means for energizing all said input circuits up to and including that circuit corresponding to the level of the produced signal, and means for applying electrical impulses to all of said electrodes associated with the activated circuits.

3. A system for conveying intelligence, comprising means for transducing said intelligence to electrical impulses, a plurality of electrodes arranged in a coordinate system adapted to be placed in intimate contact with the skin of an observer, means for separating said signal into a plurality of significant frequency components and applying said components to circuits of the electrodes in a corresponding coordinate group, and means to separate said frequency components into a plurality of significant intensity subcomponents, and means responsive to said subcomponents for applying stimulating electrical impulses to corresponding electrodes in said coordinate group.

4. A system for conveying intelligence in the form of signals, comprising means for producing the signals in electrical form, a plurality of spaced electrodes adapted to be placed in intimate contact with the skin of an observer, means for applying significant frequency components of said signals to respective pairs of said electrodes, and means for subjectively orienting said signal responsive electrodes by applying continuous electrical stimulation to one pair of electrodes.

5. A system for perceiving and distinguishing sounds which comprises means for producing electrical waves having frequency components corresponding to the frequency components of the sound waves, means for amplifying said electrical waves, means for limiting the amplitude of said waves to a predetermined level, means for equalizing the frequency response of the system, a plurality of pairs of electrodes adapted to be placed in intimate contact with the skin of an observer, means for separating the electrical signals into a plurality of frequency bands, means actuated by the signals passed by the associated bands for applying electrical impulses to respective pairs of electrodes, and means for applying a continuous signal to one pair of electrodes to aid in orienting the frequency responsive electrodes.

6. A system for conveying intelligence in the form of signals having components of various frequencies, comprising means for producing the signals in electrical form, a plurality of sets of electrodes adapted to be placed in intimate contact with the skin of an observer, means for separating the electrical signals into a plurality of frequency bands, means for separating the signals in each of said bands into a plurality of volume levels, and means for applying the signals in each band at each level to a respective pair of said electrodes.

7. A system for conveying intelligence, comprising means for transducing said intelligence to electrical impulses having significant amplitudes and frequencies, a plurality of electrodes arranged in a coordinate system and adapted to be placed in intimate contact with the skin of an observer, means for separating the electrical signals into a plurality of frequency bands, means for segregating each of said bands into a plurality of signal amplitudes, and means controlled by each segregating means for applying stimulating electrical impulses to the electrodes corresponding to the signal frequency components and amplitudes received.

8. A system for conveying intelligence in the form of signals, comprising means for producing the signals in the form of electrical waves having varying amplitudes, a plurality of spaced electrodes adapted to be placed in intimate contact with the skin of the observer, means for separating the electrical signals into a plurality of frequency bands, and means responsive to a plurality of signal levels associated with each band for applying electrical impulses to the electrodes corresponding to said signal frequencies and levels.

9. A system for conveying intelligence in the form of signals, comprising means for producing the signals in electrical form, a plurality of spaced electrodes adapted to be placed in intimate contact with the skin of an observer, means for applying significant intensity components of said signals to respective pairs of said electrodes, and means for subjectively orienting said signal responsive electrodes by applying continuous electrical stimulation to one pair of electrodes.

References Cited in the file of this patent

UNITED STATES PATENTS

| | | |
|---|---|---|
| 729,317 | Fleetwood | May 26, 1903 |
| 1,052,285 | Schwab | Feb. 4, 1913 |
| 1,738,289 | Fletcher | Dec. 3, 1929 |
| 1,823,739 | Horton | Sept. 15, 1931 |
| 2,134,028 | Caldwell | Oct. 25, 1938 |
| 2,150,364 | Dudley | Mar. 14, 1939 |
| 2,195,081 | Dudley | Mar. 26, 1940 |
| 2,327,222 | Sell | Aug. 17, 1943 |
| 2,432,123 | Potter | Dec. 9, 1947 |
| 2,465,468 | Mott | Mar. 29, 1949 |
| 2,500,638 | Krauth | Mar. 14, 1950 |

FOREIGN PATENTS

| | | |
|---|---|---|
| 221,926 | Great Britain | Sept. 25, 1924 |
| 855,848 | France | Feb. 26, 1940 |